United States Patent

[11] 3,592,299

[72] Inventor Hans Erdmann
Schonbornring, Germany
[21] Appl. No. 809,330
[22] Filed Mar. 21, 1969
[45] Patented July 13, 1971
[73] Assignee International Telephone and Telegraph Corporation
New York, N.Y.
[32] Priority Apr. 4, 1968
[33] Germany
[31] P 17 50 176.7

[54] HYDRAULIC DISC BRAKE ACTUATOR WITH A SELF-ADJUSTING MECHANISM
10 Claims, 1 Drawing Fig.
[52] U.S. Cl. ................................................. 188/71.9, 188/196
[51] Int. Cl. ..................................................... F16d 65/56
[50] Field of Search ........................................ 188/196 F, 196 P, 71.8, 71.9

[56] References Cited
UNITED STATES PATENTS
3,244,260 4/1966 Frayer ........................ 188/196 (PRR)
3,269,490 8/1966 Swift ............................. 188/71.9
3,377,076 4/1968 Burnett ......................... 188/196 P
3,460,651 8/1969 Burnett ....................... 188/196 (P) X
3,467,227 9/1969 Betart ........................... 188/71.9 X Primary Examiner—George E. A. Halvosa
Attorneys—C. Cornell Remsen, Jr., Walter J. Baum, Paul W. Hemminger, Percy P. Lantzy and Thomas E. Kristofferson ABSTRACT: A caliper-type disc brake actuator particularly suitable to automatic applications, which is operative in response to applied hydraulic pressure. A hollow-actuating piston located in an open-ended bore in a caliper housing is slidably mounted and obturated by a resilient "rollback" seal. A locknut or auxiliary piston of smaller diameter is coaxially and slidably located in the hollow actuating piston. Both the actuating piston and locknut are threaded to engage the threads of a coaxial spindle. A torsion spring operated to tend to rotate said spindle in a manner so as to cause its threads to abut against the threads of said actuating piston. This automatic adjustment presets the thread relationship thereby affording a close pad to disc spacing. A braking throw equal to the full axial thread play is available during the next braking action. A separate adjustment is provided for withdrawing the actuating piston for wear pad change, without opening the hydraulic system.

PATENTED JUL 13 1971 3,592,299
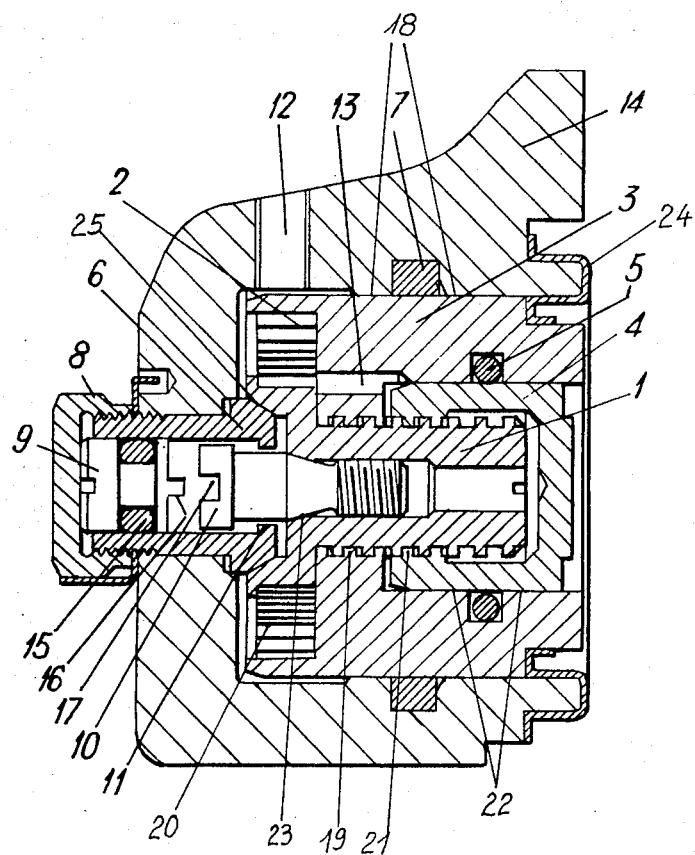
Hans Lohmann
Inventor
By William T. O'Neil
AGENT

HYDRAULIC DISC BRAKE ACTUATOR WITH A SELF-ADJUSTING MECHANISM

BACKGROUND OF THE INVENTION

1. Field of the Invention

The present invention relates to disc-type braking systems, and more particularly, to caliper-type disc braking systems with self-adjustment capability.

2. Description of the Prior Art

Disc-type brakes are well known, especially in automotive applications, including disc brakes of the fixed and floating caliper types.

It has been a general principle in the design and construction of disc brakes to provide for the smallest possible clearance between the disc and the pad of friction material (lining). Certain problems, including pad wear, caliper dilatation and other mechanical deformations of the brake system parts tend to deteriorate an adjustment rather quickly. In fact, to compensate for those variables it was usually necessary to keep the clearance relatively large so that, under worst case conditions, the piston return was sufficient to withdraw the friction pad (lining) from any residual drag on the disc.

The present invention provides a unique and highly effective solution to these prior art problems.

The invention actually prevents the development of conditions which formerly required the said large operating clearances.

BRIEF DESCRIPTION OF THE DRAWING

A single drawing identified as FIG. 1 shows a longitudinal sectional view through the centerline of an actuator assembly according to the invention.

SUMMARY OF THE INVENTION

The present invention comprises an automatically operating brake clearance adjusting device operative after each application of braking pressure. Although the invention should not be considered limited in application to hydraulic caliper-type disc brake systems, it is particularly useful in that particular art.

An objective of the present invention achieved in the implementation of the device to be described, concerns the establishment of an automatic adjustment which "winds out" the free play in a threaded spindle/actuating cylinder thread engagement to thereby provide for a small, but accurately regulated, brake clearance. As an added feature, the present invention provides for partial withdrawal of the actuating piston by means of a handtool-operated capscrew which bottoms in a socket in said threaded spindle and, when turned, is capable of turning the spindle which in turn partially withdraws the actuating cylinder to permit changing of the brake lining.

The access to the capscrew is provided within a closable-ended hollow bushing at the outer end of the caliper housing (opposite the lining end).

The novel structure for achieving the aforementioned preconditioning to "wind out" thread play involves basic elements including; the threaded spindle, the actuating piston, a torsion spring not unlike a clock mainspring, and a locknut.

Hydraulic pressure moves the actuating piston in a well-understood way against a ring shaped resilient "rollback" seal in a housing groove around the piston periphery. This type of seal also is hydraulic fluidtight and when used as an element to supply restoring force against the hydraulically actuated piston is economical and precise, provided the piston throw against it is limited and repeatable.

In the structure of the present invention, there is intentional and predetermined axial thread free play in thread engagements between the spindle and the actuating position, and also similarly between the spindle and the locknut. During each braking action, the spindle is locked by hydraulic "jamming" of the locknut and no rotation of the spindle and consequent adjustment action is permitted at that time.

After a braking action however, the locknut releases, and adjustment sufficient to preload the axial thread free play against the rollback seal elements is effected. Thus the said free play is the maximum amount of actuating piston throw available for the next braking action and the incremental stressing of the rollback seals is thereby predetermined and limited. The automatic advancement of the actuating cylinder in compensation for wear and other effects hereinbefore mentioned to establish and preserve a close lining-to-disc quiescent spacing is also thereby accomplished.

A more detailed description of how the elements of the invention cooperate in effecting these desirable results follows in the section on "Description of the Preferred Embodiment."

DESCRIPTION OF THE PREFERRED EMBODIMENT

Referring now to the FIGURE, the preferred embodiment will be described in detail.

FIG. 1 shows a longitudinal sectional view as provided by cutting plane containing the axial centerline of the operating parts of the device. It will be understood that the view is of half of a fixed caliper disc brake actuation system, the functioning of the unillustrated half being substantially identical.

A caliper housing 14, which would normally be a suitable casting, provides the shell containing the functional parts in bored cavities.

A main actuating piston 3 is emplaced in 14 and is fit so as to readily slide axially (parallel to the centerline) within 14 at the cylindrical surfaces of contact 18. A ring-shaped resilient member 7 (a suitable grade of rubber for example) resides in a ring groove in 14 and acts in the dual role of oburating these sliding surfaces (sealing against leakage of the actuating medium) and of providing a "rollback" or restoring force against the piston 3 when it is extended in operation by the actuating pressure medium (normally hydraulic oil or fluid as commonly used in braking systems).

At threaded area 19 thread engagement of the actuating piston 3 is effected with a threaded spindle 1. A spiral wound spring 2 is contained in a counterbore in 3 as illustrated. This spring is attached on its outer end to the piston 3 and at its inner end to that portion of the diameter of 1 at 20. Thus, it will be seen that said spring is capable of exerting a rotational force acting between 3 and 1, which, in turn, tends to cause relative axial motion between these two members due to the pitch of the threads 19. The so-called "rollback" packing 7 deforms as the piston 3 advances under hydraulic actuation pressure. There is no substantial sliding action of 3 against 7, nor is there any rotational freedom for 3 against the relatively tight frictional engagement between 3 and 7.

It will be noted that the thread spindle 1 similarly engages a hollow cylinder-shaped locknut 4 slidably inserted into a bore in 3. A threaded engagement at 21 between 4 and 1 operates similarly to the threaded engagement 19 previously referred to. The rollback packing 5 is structurally similar to and functions in a manner similar to the function of 7. That is to say, the packing 5 resists axial motion of 4 with respect to 3 and substantially eliminates relative rotation between 3 and 4 during any aspect of normal operation. The member 5 is located in a ring groove in 3 and oburates the sliding surfaces 22 (a similar ring groove was seen to be provided in 14, in which the "rollback" packing 7 resides).

The threading of the full length of the smallest diameter of threaded spindle 1 is preferably an acme thread because of its inherent strength and suitability for operation where the axial play in the threaded engagements at 19 and 21 resulting from intentional thread construction is a useful aspect of the structure and operation of the present invention, as will be appreciated as this description proceeds.

A bushing 6, which is itself hollow is press fitted into a bore in the closed end of the housing 14. As illustrated, the internal end of this bushing has a truncated convex conical shape which accommodates a corresponding concavity on the end of spindle 1 so that the bushing provides a back stop for the spindle.

From the foregoing, it will be apparent that in normal operation the only member which is permitted rotational motion is the threaded spindle 1. The axially wound spring 2 is to be understood to be strong enough and emplaced in a predetermined windup condition such that it readily overcomes the thread friction along the thread contact areas 19 and 21 during the adjustment cycle which immediately follows each braking action, thereby causing predetermination of the thread free play for the next braking action.

The actual pad of friction material and the disc included in a disc braking system are not illustrated since they would be substantially in conformity with known techniques and so not form a part of this invention.

It is to be understood that the motions involved in both operation and in automatic adjustment are relatively small. The method of employing the "rollback" seals is obviously not adapted to large motions, but since it is desired to maintain a close pad to disc tolerance, the "rollback" seal is well adapted.

Viewing FIG. 1, if the right and left sides of the drawing are considered, the right and left sides of the device respectively, it should be noted that the pad of friction material would be mounted on the right end of the actuating piston 3 in a conventional manner. The disc would lie to the right of the pad with its shaft parallel to the centerline and generally below the illustration of FIG. 1. The plane of contact of the disc and pad is therefore at right angles with the said centerline.

Referring to the threads of the spindle 1 as viewed in FIG. 1, the flanks of each thread tooth will be identified for further description as left or right thread flanks in accordance with right and left on FIG. 1. The teeth of the engaging threads of actuating piston 3 and locknut 4 at 19 and 21 respectively, will be referred in the same way. The actual direction of rotation of spindle 1 to accomplish its function during adjustment depends on whether right or left hand threads are employed.

Each braking cycle is followed by an automatic adjust cycle, although the actual amount of adjustment will normally be very small.

To trace an operational cycle, one may begin with the application of pressure to the pressure medium via inlet 12. The fluid flows through clearances between the housing 14 and the internal parts and through the passage 13 which is a bore in the actuating piston through its largest diameter section parallel to the centerline. Before introduction of the pressure medium, the rollback packing 5 would be substantially unstressed as it was left after the last actuate/adjust cycle. As the pressure medium force builds up, the locknut 4 (translation of which is resisted by 5 to a somewhat lesser extent than translation of 3 is resisted by 7) immediately moves to the right against the resistance of rollback packing 5.

This results in locking of the spindle 1, so that it cannot turn and withdraw itself from the locknut. That is to say, the left thread flanks of 4 are fayed against the right thread flanks of spindle 1 which, together with the reaction of 5, produces locking. This disables the adjustment action since the hydraulic forces involved are relatively large compared to the forces exerted by the spring 2. It should be pointed out that the said spring 2 is wound with axial pitch so that it is capable of exerting an axial force tending to keep spindle 1 back against the buffer bushing 6, as well as the rotational force.

At this point in the description it would be well to observe that the maximum normal throw of the actuating piston 3 during braking is equal to the axial thread clearance along the area of engagement 19.

As hereinbefore stated, it is a purpose of the present invention to automatically adjust (advance) the pad to a close spaced relationship with the disc and to maintain this condition.

The present invention accomplishes that objective by incorporating means to precondition the thread engagement at 19 so that the right thread flanks of the spindle 1 are in contact with the left flanks of the corresponding thread flanks of 3. This allows a braking action motion up to the amount of the full axial thread play at 19 after the completion of an adjustment cycle.

Starting at the release of hydraulic pressure after a braking action, the rollback packings restore the locknut 4 and the actuating piston 3 to their rest positions (one axial thread play amount to the left) against the opposite thread flanks of spindle 1. Once the locknut is in or near this rest position, the spindle is free to turn (withdraw to the left from engagements 19 and 21). This small amount of withdrawal or unscrewing action is in the direction such that at least piston 3 has its thread engagement biased as far left as possible and has available up to the full thread axial free play for the next braking action. Also, during this adjustment the spindle 1 tends to become seated with its countersunk bore fayed against the conical end of the buffer bushing 6 along surface of contact 25. This terminates the adjustment action and the device is now ready for a next braking application.

As an added feature, it will be noted that, in this fully adjusted condition the pad actuated by 3 could act as an abutment to pressure applied against the disc from the pad on the opposite side of the caliper. This is because all thread play has been absorbed by the aforesaid adjustment cycle and if one pressure medium to supply to one side of the caliper should fail, that side could abut the pressure of the other pad without the need to first overcome play in the inactive side of the caliper. This advantage, moreover, is useful when a mechanical override is applied to one caliper side, as by a parking or handbrake.

It will also be seen that the adjustmental feature of the present invention tends to control the increment of motion over which the rollback packings are required to operate and still seal properly.

Referring again to FIG. 1, it will be noted that the buffer bushing 6 contains an axial bore terminated in a shoulder 11 at its right end. A capscrew 10 is screwed into internal threading in spindle 1, as illustrated. The capscrew has a conical diameter-reducing section which fays on a corresponding countersink in spindle 1 as shown at 23. It will be noted that allowance his been made for movement of spindle 1 to the right before the head of capscrew 10 strikes shoulder 11. The body of the screw 10, moreover, clears the bushing bore as it passes through the area of shoulder 11. In this way, the screw 10 does not add frictional resistance to rotational motion or translation of spindle 1.

A capnut 8 serves to close the end of the hollow bushing 6, but can be removed to expose a floating intermediate piston 9. This piston 9 is sealed by an "O" ring or packing 15, but can be moved axially as by screwdriver pressure in its left end slot, and then rotated after projection 16 is engaged in slot 17. In this way the screw 10 and the entire spindle 1 may be rotated to withdraw 3 and 4 together by thread screw action. Such a withdrawal permits removal and replacement of the pad assembly which, as previously stated, is between the actuator piston extremity and the disc, without opening the hydraulic system.

The end seal 24 is to be understood to be made of resilient material such as rubber so that it does not substantially resist movement of actuating piston 3, and is not required to provide pressure sealing.

The so-called fixed caliper arrangement has been assumed throughout, but it will be noted that there is applicability to the "floating caliper" type of system as well.

While most useful in hydraulic automotive braking systems, the concepts of the present invention have applicability in fixed and mobile braking systems using air or other pressure media.

What I claim is:

1. An adjusting device for a hydraulically actuated brake having a pressure-responsive actuating piston in an open-ended cylinder, the piston being adapted to move a brake pad toward a rotating member to be braked, means for retracting the piston, a spindle threaded into the piston and spring biased toward an extended position in which the spindle abuts against the bottom of the cylinder to limit retraction of the piston, the threaded connection between the spindle and the piston having an axial clearance equal to the desired clearance between the brake and the rotating member in the released condition, characterized by hydraulically actuated locking means responsive to the hydraulic brake pressure for preventing rotation of the spindle when the brake pressure is applied to the piston.

2. An adjusting device as defined in claim 1, wherein said means for providing a restoring force biasing the piston towards the retracting position comprises a resilient annular sealing ring in an annular groove between the piston and the cylinder, the sealing ring being adapted to frictionally grip the piston and provide a restoring force for retracting the piston when the braking pressure is released.

3. An adjusting device for a pressure medium operated brake system having a slidable hollow actuating piston in an open-ended cylinder housing and including means for applying said pressure medium during braking in a manner so as to cause said piston to translate axially to apply the brake comprising the combination of:

means providing a restoring force biasing the piston toward its retracted position;

an externally threaded spindle disposed coaxially within said hollow piston, one end of the spindle adapted to abut against the end of the cylinder to limit retraction of the piston and the threads of said spindle engaging corresponding threads on an internal portion of said hollow piston forming a first thread engagement, said first thread engagement having predetermined axial play equal to the desired brake clearance in the released condition;

torque means operatively connected to rotate said spindle in a direction so as to bias said first thread engagement at one extremity of said axial thread play whereby to make the full amount of said play available for said axial translation of said actuating piston during braking; and locking means responsive to the application of pressure to said pressure medium to prevent operation of said adjustment means during braking.

4. The invention set forth in claim 3 in which said means connected to rotate said spindle comprises a circumferentially wound spring connected to exert a rotational force between said actuator piston and said spindle.

5. An adjusting device as defined in claim 3, wherein said means for providing a restoring force biasing the piston toward the retracted position comprises a resilient annular sealing ring in an annular groove between the piston and the cylinder, the sealing ring being adapted to frictionally grip the piston and provide a restoring force when the braking pressure is released.

6. An adjusting device as defined in claim 3, wherein said locking means comprises a locking piston slidable within said hollow-actuating piston, the locking piston having a threaded section engaging said spindle threads and being movable in response to a braking pressure to jam against the spindle threads and to prevent rotation of the spindle.

7. An adjusting device as defined in claim 6 including means for drawing the actuating piston into the cylinder comprising abutments on the spindle and cylinder limiting the movement of the spindle away from the end of the cylinder, and means for manually rotating the spindle in the direction opposite the adjusting direction whereby the piston may be retracted.

8. The invention set forth in claim 6 further defined in that a hollow bushing located coaxially with respect to said spindle and actuating cylinder and fixed through the end of said housing opposite said actuating piston, and said circumferentially wound spring is also wound to exert an axially directed force tending to keep said spindle axially fayed against the end of said bushing extending within said housing.

9. The invention set forth in claim 8 in which auxiliary means are included within said hollow bushing for manually turning said spindle in response to the rotational force of a handtool thereby to withdraw said actuating piston from its quiescent position.

10. The invention set forth in claim 9 in which said auxiliary means includes a floating intermediate piston within said hollow bushing with rotational and translational freedom, means for obturating the sliding surface between said floating piston and the inside wall of said bushing, means for making said floating piston responsive to rotation and translation within said bushing in response to the rotational and axial force of an applied handtool, screw means engaging said spindle in rotational security, and means for causing said floating piston to engage said screw means in rotational security in response to said applied handtool translational and rotational forces.